United States Patent
Mui et al.

[11] Patent Number: 6,160,642
[45] Date of Patent: Dec. 12, 2000

[54] INTEGRATED PRINTER AND SCANNER DEVICE

[75] Inventors: Paul K. Mui, Boise; Peter Gysling, New Plymouth; Russell A. Mendenhall, Boise; Seana Lahey Young, Boise; Tim M. Hoberock, Boise, all of Id.

[73] Assignee: Hewlett-Packard Company, Palo Alto, Calif.

[21] Appl. No.: 09/218,908

[22] Filed: Dec. 22, 1998

[51] Int. Cl.$^7$ ........................................... H04N 1/04
[52] U.S. Cl. ........................ 358/498; 358/497; 358/496
[58] Field of Search ........................ 358/1.1, 1.2, 1.3, 358/1.4, 1.5, 1.6, 1.7, 1.8, 1.9, 1.11, 1.15, 1.13, 1.12, 1.14, 1.16, 1.17, 1.18, 496, 497, 498, 401, 419, 473, 400; 399/82

[56] References Cited

U.S. PATENT DOCUMENTS

| | | | |
|---|---|---|---|
| 5,166,812 | 11/1992 | Dow et al. | 358/498 |
| 5,918,088 | 6/1999 | Rikima | 399/82 |
| 5,956,160 | 9/1999 | Watanabe | 358/496 |

OTHER PUBLICATIONS

Advertisement: "I've Got The Power [Phone]"; T3, Oct. 1998; p. 101; Power Phone by iMagic Infomedia Technology Limited.

*Primary Examiner*—Jeffrey Gaffin
*Assistant Examiner*—Thanh Y. Tran
*Attorney, Agent, or Firm*—Lane R. Simmons

[57] ABSTRACT

An integrated printer/scanner device includes a housing that supports a scanner module and a printer that are operatively coupled together. In a preferred embodiment, the scanner module is slidably disposed in the housing and formed such that, in a home position, a portion of the scanner module extends beyond the housing. The extending portion includes a control panel thereon for operatively controlling the printer and scanner module. Preferably, the scanner module includes an automatic document feeder (ADF) for receiving documents to be scanned while the module is disposed in the home position. Additionally, the scanner module is configured such that the ADF automatically opens when the scanner module is slid out to its extended position.

21 Claims, 7 Drawing Sheets

INTEGRATED PRINTER AND SCANNER DEVICE

FIELD OF THE INVENTION

This invention relates in general to image forming devices and, more particularly, to a printing device having an integrated scanner.

BACKGROUND OF THE INVENTION

Multi-function peripheral imaging devices are common in today's computing environments. For example, some printing devices (such as laser printers or ink jet printers) are now integrated with copying, scanning and/or faxing capabilities. However, because of the difficulty of integrating flat-bed scanning capabilities with a printer, many of these devices only allow sheet fed scanning. Thus, the ability to scan books, photographs, and other non-sheet media is limited.

To enable full scan capabilities, some printer/copier devices mount the scanner over the printer with a mounting stand. However, this significantly increases the overall height of the product because the stand has to completely clear the printer for non-disruptive access to the output paper and toner cartridge (in the case of a laser printer). Additionally, a scanner mounted above the printer is more impact and shock prone, thus requiring significant support structure and strength to minimize and absorb impact and to maintain acceptable scan/print quality. Moreover, a scanner located on a stand above a printer just does not create an aesthetically integrated look, but rather suggests that the scanner is an after thought part of the product.

U.S. Pat. 5,166,812 (issued to Dow et al.) describes a fax machine having a document feeder and control panel mounted inside a retractable drawer. The fax machine may be a module having a flat upper surface adapted to support a printer thereon. However, the Dow et al. device is more modular oriented than integrated and, as such, lacks some user interface features that are beneficial to integrated devices. For example, the control panel is not accessible for device operation unless the drawer/scanner is pulled open. Additionally, the control panel only operates the fax machine and would not operate a printer if one were supported on top. Similarly, a sheet cannot be fed to the scanner unless the drawer/scanner is pulled open. Moreover, since no scan bed is provided, book scanning requires the inconvenient use of a separate hand-held device.

Accordingly, an object of the present invention is to provide an improved integrated printer and scanner device.

SUMMARY OF THE INVENTION

According to principles of the present invention, an integrated printer/scanner device includes a housing that supports a scanner module and a printer that are operatively coupled together. In a preferred embodiment, the scanner module is slidably disposed in the housing and formed such that, in a home position, a portion of the scanner module extends beyond the housing. The extending portion includes a control panel thereon for operatively controlling the printer and scanner module.

According to further principles in a preferred embodiment, the scanner module includes an automatic document feeder (ADF) for receiving documents to be scanned while the module is disposed in the home position, i.e., without having to extend out the scanner module. Additionally, the scanner module is configured such that the ADF opens automatically when the scanner module is slid out to its extended position.

Other objects, advantages, and capabilities of the present invention will become more apparent as the description proceeds.

DETAILED DESCRIPTION OF THE INVENTION

Figure 1:
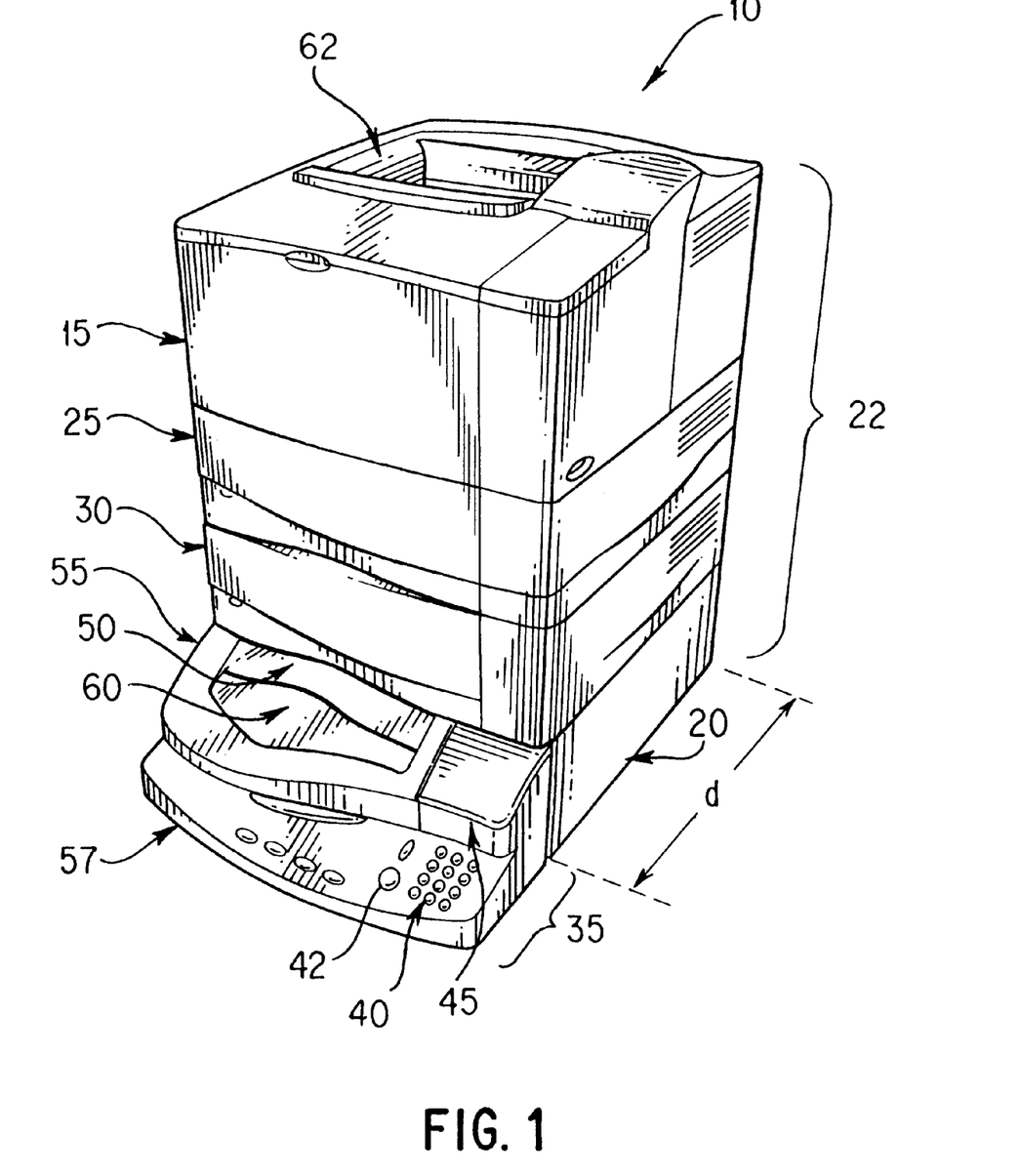
FIG. 1 is a perspective view of an integrated printer and scanner of the present invention with the scanner module disposed in a home position.

FIG. 1 is a perspective view of an integrated printer/scanner device 10 under principles of the present invention. Integrated device 10 includes printer 15 and scanner module 20 in housing 22. In a preferred embodiment, printer 15 is an electrophotographic printer having a laser print engine as well known in the art. However, it is understood that under principles of the invention, printer 15 may also be an ink jet printer having a conventional ink jet engine, or printer 15 may be some other conventional printing device. In the embodiment shown, integrated device 10 includes two media holding trays 25 and 30 that are slidably extendable from housing 22. However, device 10 may include other variations or multiples of trays. Thus, in a preferred embodiment, housing 22 is modular in form.

Scanner module 20 includes scanning technologies and functionalities as conventional in the art and is operatively connected to printer 15. Scanner module 20 operatively connects with printer 15 using conventional cabling (not shown) or other operable means such as infrared. Importantly, scanner module 20 is slidably disposed in housing 22 (or in a module of housing 22) in a drawer-like configuration. To this regard, in FIG. 1, scanner module 20 is shown as being disposed in a "home" position within housing 22. On the other hand, when scanner module 20 is slid out (or extended out) from housing 22 (see FIG. 2), it is deemed to be in an "extended" position for purposes of discussion herein.

In a preferred embodiment, scanner module 20 is disposed at a base of housing 22 and has a form factor similar to that of housing 22, but includes a portion 35 that extends beyond depth "d" of housing 22. Although portion 35 increases the base footprint of printer/scanner 10, it provides a strategic surface area for enabling control panel 40 to be visibly disposed thereon and easily accessible by a user. Alternatively (not shown), scanner module 20 is of similar size and shape as housing 22 and does not include extending portion 35. In this alternate configuration, control panel 40 is mounted on an external surface of scanner module 20 generally flush with housing 22. However, in either embodiment, importantly, control panel 40 remains easily accessible and useable without having to extend open scanner module 20.

Control panel 40 enables a user to configure and use printer/scanner 10. For example, if a user desires to configure printer 15 to accept A4 size paper in first media tray 25, then control panel 40 is used to accomplish this in a manner similar to that as conventional in the art. Additionally, if a user desires to make a copy of a sheet document, then control panel 40 is also used to accomplish this, such as with a "copy" button 42. In any case, the strategic location of control panel 40 on scanner module 20 at the base of housing 22 enables easy access by a user in a typical home or office environment. Namely, for example, if printer/scanner 10 is disposed on a desk or table top, a user that is sitting nearby is able to clearly and easily see the control panel and any message it may be displaying on display panel 45, and the user may likewise easily operate the control panel from a sitting position. On the other hand, if control panel 40 were placed on top of printer/scanner 10, the user might have to stand up to operate the device, thus unnecessarily inconveniencing the user.

Scanner module 20 includes an upper portion, such as automatic document feeder (ADF) 55, and a scan bed portion 57. In a preferred embodiment, control panel 40 is disposed on a framework of scan bed portion 57. As such, when module 20 is extended and ADF 55 is lifted to expose the glass of scan bed 57, control panel 40 (including display 45) is not lifted but remains visible and easily accessible for continued use.

For scanning purposes, when scanner module 20 is in the "home" position as shown in FIG. 1, sheet media is fed into slot 50 of ADF 55 and returned through slot 60 after having been scanned. Conveniently, scanner module 20 does not need to be extended out for this automatic sheet feed/scan to occur. Additionally, to this regard, sheet length is not a limiting factor (as may occur in a size restrictive media tray of certain conventional automatic document feeders). Once scanned, the image is operatively transferred to memory in printer 15 where it is stored for subsequent imaging onto media received from either tray 25 or 30 and then transferred to output tray 62. Alternatively, the scanned image is stored for other electronic transfer such as faxing or e-mail.

Figure 2:
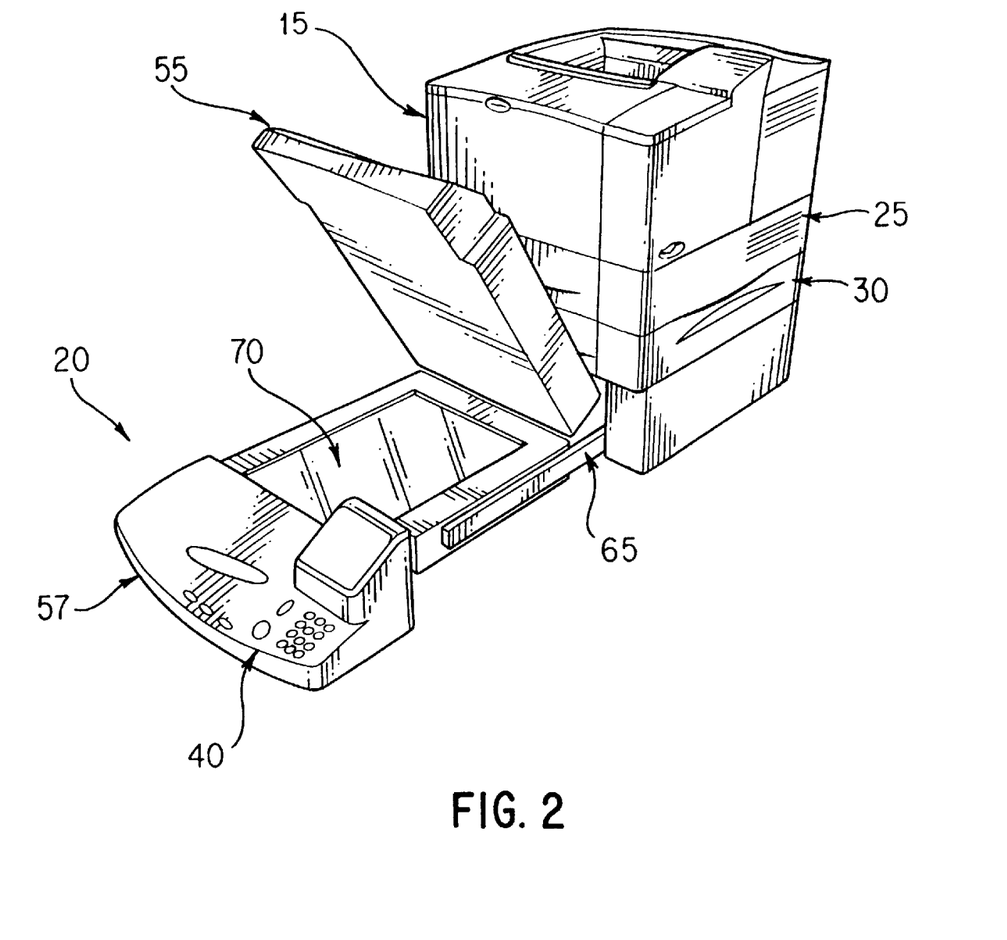
FIG. 2 is a perspective view of the present invention with the scanner module disposed in an extended position and with the automatic document feeder lifted to expose the scan bed.

When a book, photograph or other non-sheet media is to be scanned, scanner module 20 is moved to its extended position for scan bed use as shown in FIG. 2.

Referring now to FIG. 2, a perspective view of printer/scanner 10 shows scanner module 20 disposed in its extended position using rail structures 65 and with ADF 55 lifted to expose glass 70 of scan bed 57. In this open position, a book, photograph or other non-sheet media can easily be placed on glass 70 to be scanned.

In a preferred embodiment, scanner module 20 is extended from within housing 22 and ADF 55 is opened to expose glass 70 in a single automated step for a simple one-handed operation. This automation is enabled via mechanical or electromechanical means as will be described in reference to FIGS. 3A–D and FIG. 4. Once fully extended and opened, ADF 55 may be opened or closed down upon glass 70 manually at will. Alternatively, ADF 55 is manually opened to expose glass 70 once scanner module 20 is extended from within housing 22.

Figure 3A:
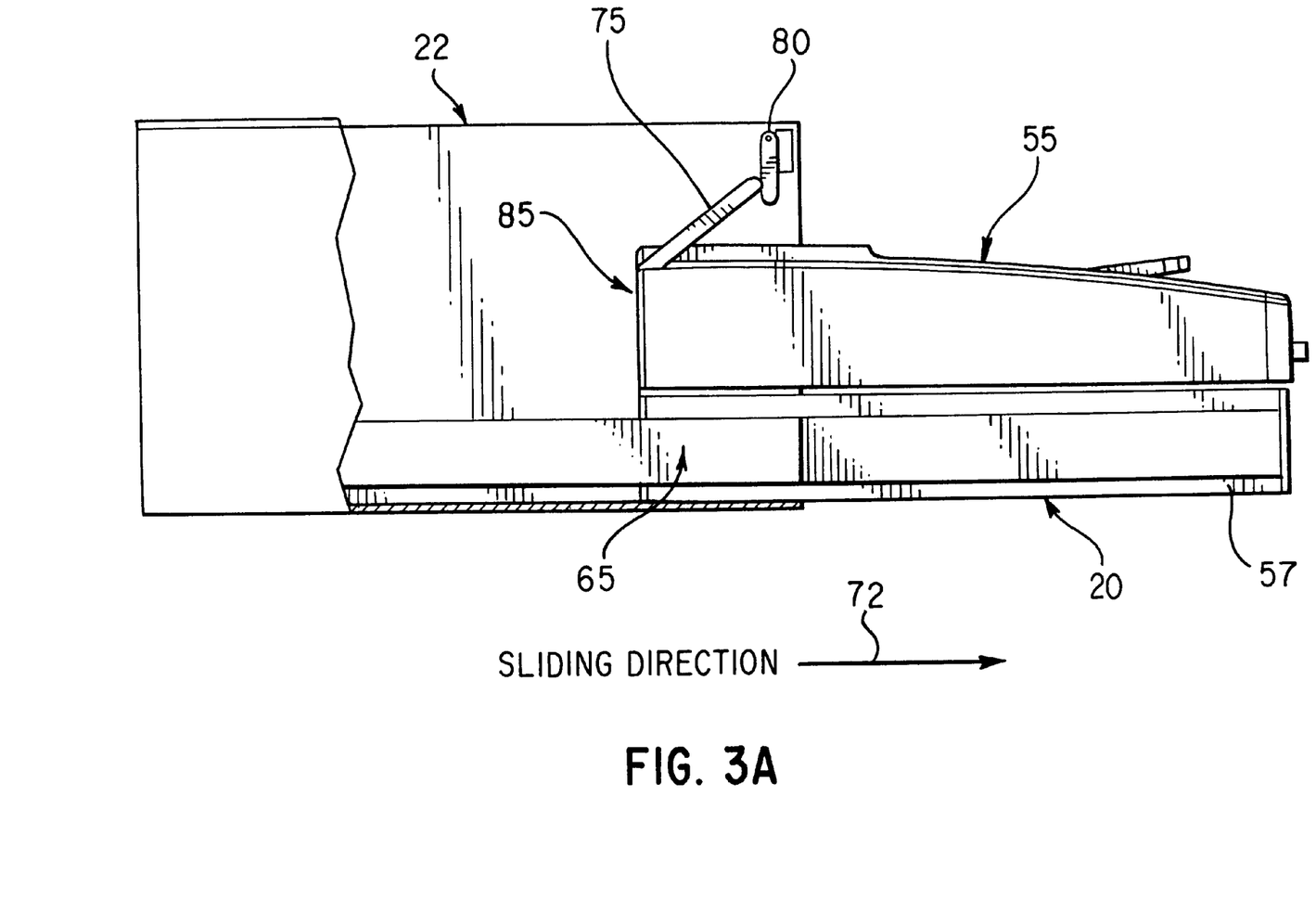
FIGS. 3A–C are cross sectional schematic side views of the scanner module including a mechanical means for automatically opening the automatic document feeder when the scanner module is pulled out for scan bed use.

FIG. 3A is a cross sectional schematic side view of scanner module 20 in a partially extended (outward interim) position as it is being slid out from housing 22 in a "outward" direction 72. In this outward interim position, lift arm 75 contacts one-way pivot mechanism 80. Lift arm 75 is a structurally sound piece that is attached to aft portion 85 of ADF 55. Since one-way pivot mechanism 80 does not pivot in the "outward" direction, it contacts lift arm 75 and causes ADF 55 to lift (or rotate) up as scanner module 20 is slid out.

Figure 3B:
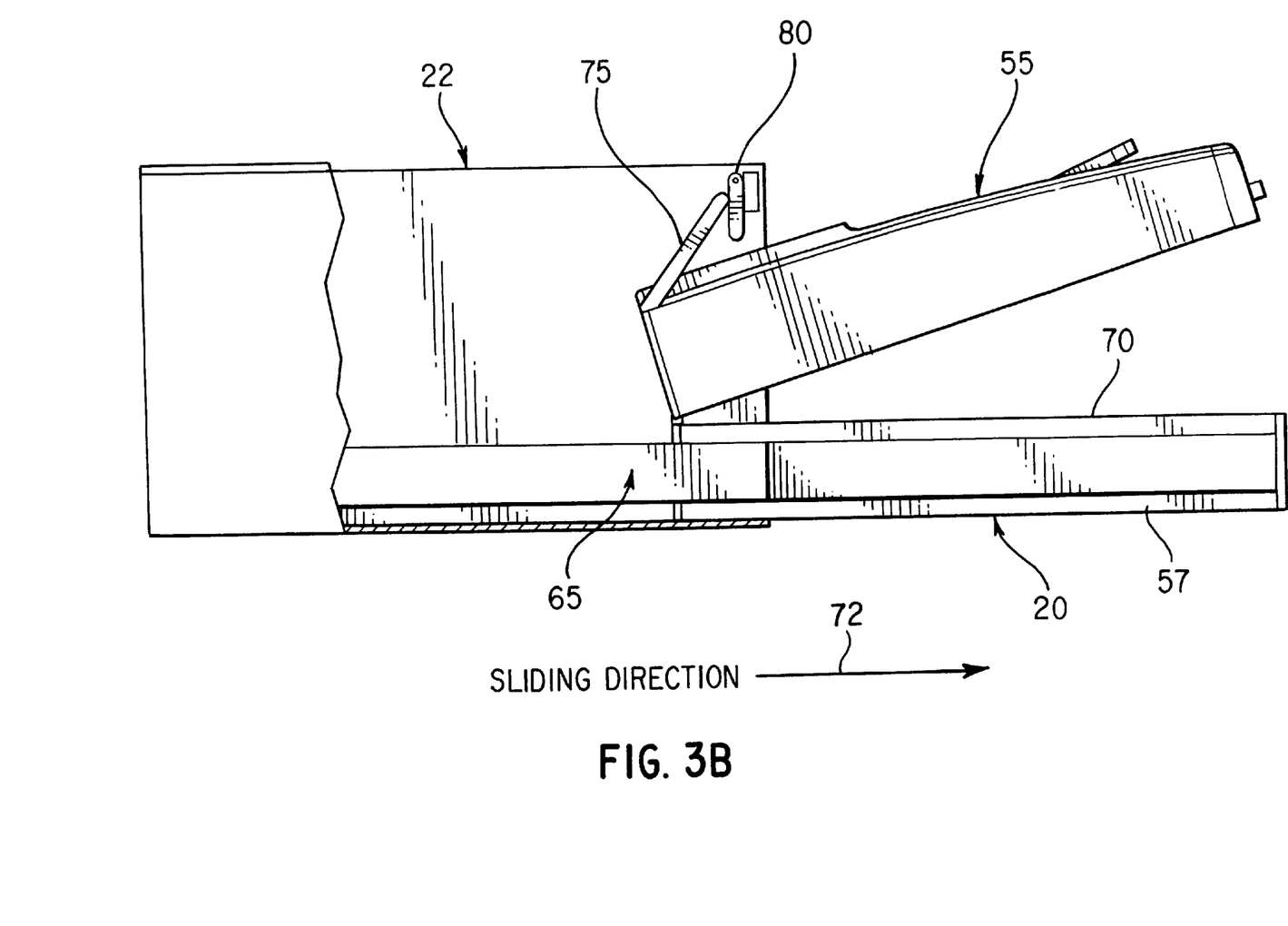
Figure 3C:
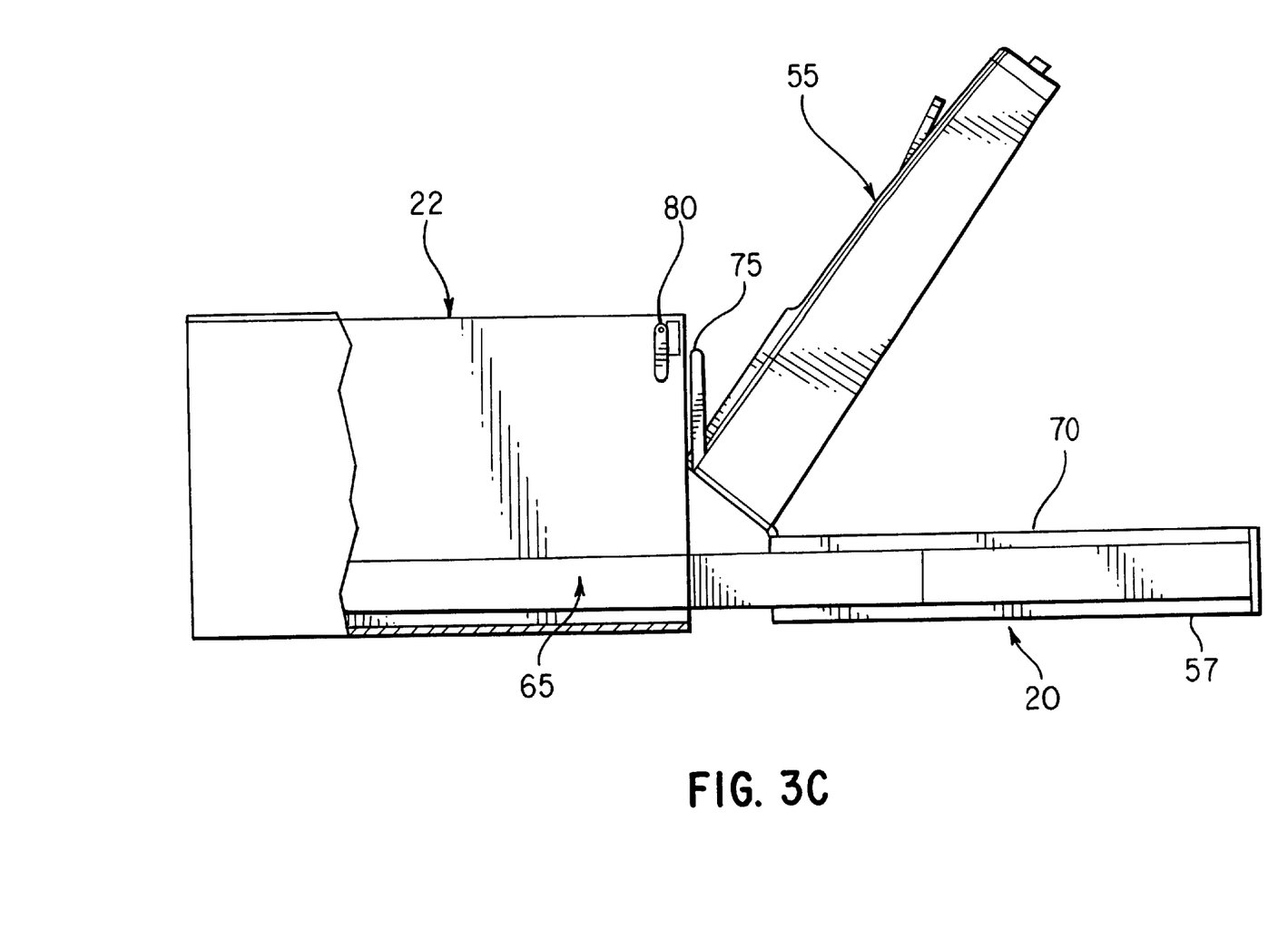

FIG. 3B depicts ADF 55 being further lifted as scanner module 20 continues to be slid out in outward direction 72. FIG. 3C depicts scanner module 20 fully extended with ADF 55 fully lifted and balanced so as to remain in this lifted (opened) position until manually moved by a user. In this state, lift arm 75 is slid completely past one-way pivot 80. As such, ADF 55 may now be manually closed onto scan bed 57 at will, or re-opened at will by the user.

Figure 3D:
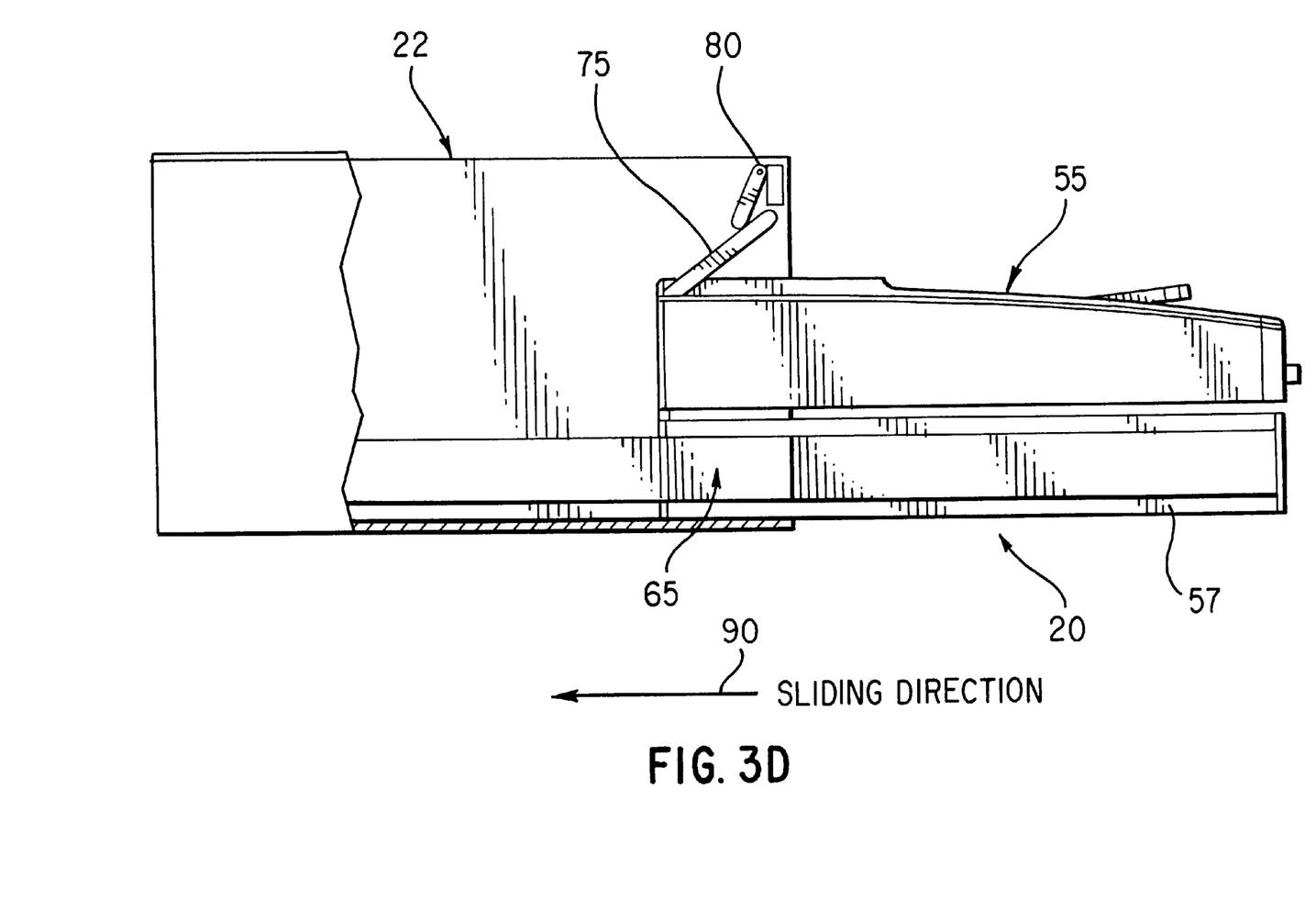
FIG. 3D is a cross sectional schematic side view of the scanner module in a state of being returned to its home position.

FIG. 3D depicts scanner module 20 being slid back into housing 22 in a "inward" direction 90 (i.e., after scanning is completed). One-way pivot mechanism 80 pivots in the "inward" direction 90 when lift arm 75 contacts it, thus allowing the entire scanner module 20 to return to its home position within housing 22.

Figure 4:
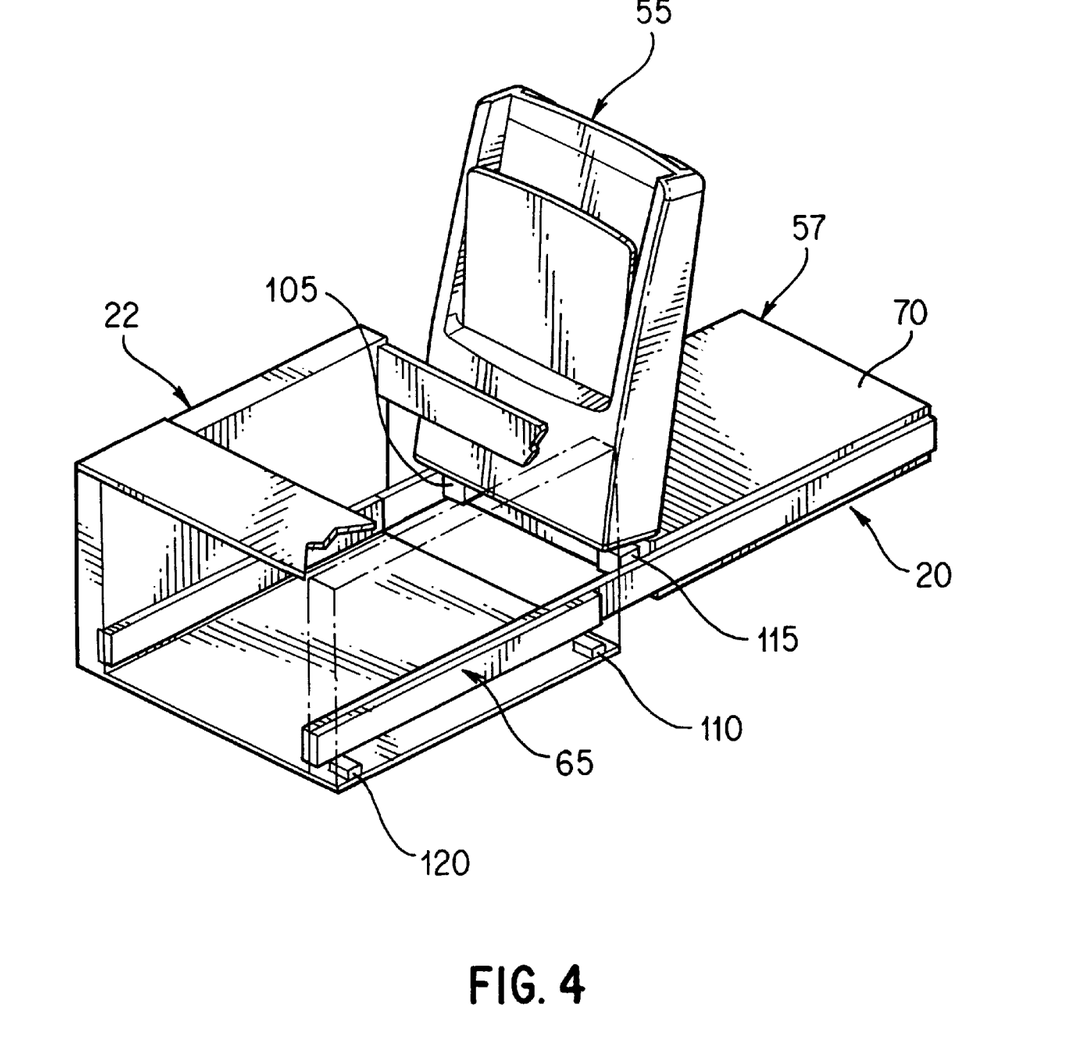
FIG. 4 is a perspective cut-away schematic view of the scanner module and an alternative electromechanical means for automating its use.

FIG. 4 is a perspective cut-away schematic view of scanner module 20 showing an alternative means for automating the use of scanner module 20. The embodiment of FIG. 4 enables the automatic extending of scanner module 20 from housing 22 and the automatic opening of ADF 55 to expose glass 70 at the touch of a button on control panel 40 (see FIG. 1). Specifically, when the appropriate button is pressed, a signal activates motor 105 which is geared (or belt driven) to extend scanner module 20 to its extended position as shown in FIG. 4. When scanner module 20 is in the extended position, photo sensor 110 is triggered to activate motor 105 to lift up (or rotate up) ADF 55 to its open position as shown. When ADF 55 is in its fully open position, photo sensor 115 is triggered to deactivate motor 105. At this position, the user can close and open ADF 55 freely to access glass 70. When use of scanner module 20 in its extended position is completed, the user once again presses the appropriate button on control panel 40 to activate motor 105 which retracts scanner module 20 back to its home position within housing 22. When scanner module 20 reaches its home position, photo sensor 120 is triggered to deactivate motor 105, thus completing the automated process. It should be noted that although sensors 110, 115 and 120 are described as photo sensors in this embodiment, it is understood that other types of sensors well known in the art are similarly usable.

In summary, the present invention provides a uniquely integrated printer and scanner for improved ease of operation. It will be obvious to one of ordinary skill in the art that the present invention is easily implemented utilizing any of a variety of components and tools existing in the art. Moreover, while the present invention has been described by reference to specific embodiments, it will be apparent that other alternative embodiments and methods of implementation or modification may be employed without departing from the true spirit and scope of the invention.

What is claimed is:

1. An imaging device, comprising:

(a) a housing;

(b) a Printing device disposed within the housing; and, (c) a scanner module operatively coupled to the printing device and slidably disposed in the housing, the scanner module having a control panel configured on an exterior surface thereof to enable a user to operatively control the printing device and scanner module while the scanner module is disposed in a home position within the housing.

2. The imaging device of claim 1 wherein the scanner module further includes a portion that extends beyond the housing while the scanner module is disposed in the home position within the housing, the portion having the control panel configured thereon for operatively controlling the printing device and scanner module while the scanner module is disposed in the home position within the housing.

3. The imaging device of claim 1 wherein the scanner module includes an automatic document feeder for receiving documents while the scanner module is in the home position.

4. The imaging device of claim 1 wherein the scanner module includes a scan bed and an upper portion, and wherein the upper portion covers the scan bed when the scanner module is in the home position, and wherein the upper portion exposes the scan bed when the scanner module is in an extended position.

5. The imaging device of claim 4 wherein the upper portion is an automatic document feeder.

6. The imaging device of claim 4 wherein the control panel is disposed on a framework in connection with the scan bed.

7. The imaging device of claim 4 further including means for enabling the upper portion to automatically expose the scan bed when the scanner module is slid into the extended position.

8. The imaging device of claim 7 wherein the means for enabling the upper portion to automatically expose the scan bed includes a one-way pivot mechanism.

9. The imaging device of claim 7 wherein the means for enabling the upper portion to automatically expose the scan bed includes a motor and sensors.

10. The imaging device of claim 1 wherein the printing device is a laser print device or an ink jet print device.

11. The imaging device of claim 1 wherein the scanner module is disposed at a base of the housing.

12. The imaging device of claim 1 wherein the housing includes modular components.

13. An imaging device, comprising:
  (a) a housing;
  (b) a printing device disposed within the housing; and,
  (c) a scanner module operatively coupled to the printing device, wherein the scanner module is slidably disposed in the housing such that, in a home position, a portion of the scanner module extends beyond the housing, the portion having a control panel configured thereon to operatively enable a user to control the printing device and scanner module while the scanner module is in the home position.

14. The imaging device of claim 13 wherein the scanner module includes an automatic document feeder for receiving documents while the scanner module is in the home position.

15. The imaging device of claim 13 wherein the scanner module includes a scan bed and an upper portion, and wherein the upper portion covers the scan bed when the scanner module is in the home position, and wherein the upper portion exposes the scan bed when the scanner module is in an extended position.

16. The imaging device of claim 15 further including means for enabling the upper portion to automatically expose the scan bed when the scanner module is slid into the extended position.

17. The imaging device of claim 16 wherein the means for enabling the upper portion to automatically expose the scan bed includes a one-way pivot mechanism.

18. The imaging device of claim 16 wherein the means for enabling the upper portion to automatically expose the scan bed includes a motor and sensors.

19. The imaging device of claim 13 wherein the printing device is a laser print device or an ink jet print device.

20. The imaging device of claim 13 wherein the scanner module is disposed at a base of the housing.

21. A multi-function device, comprising:
  (a) a printing device; and,
  (b) a scanning device slidably configured within a housing that is cooperatively configurable with the printing device, the scanning device having a control panel configured to enable operation by a user of the scanning device and printing device while the scanning device is slidably disposed in a home position within the housing.

* * * * *